May 29, 1962   H. J. NEHER   3,036,721
APPARATUS FOR TRANSPORTING STACKS OF BRICK AND THE LIKE
Original Filed Sept. 25, 1958   7 Sheets-Sheet 2
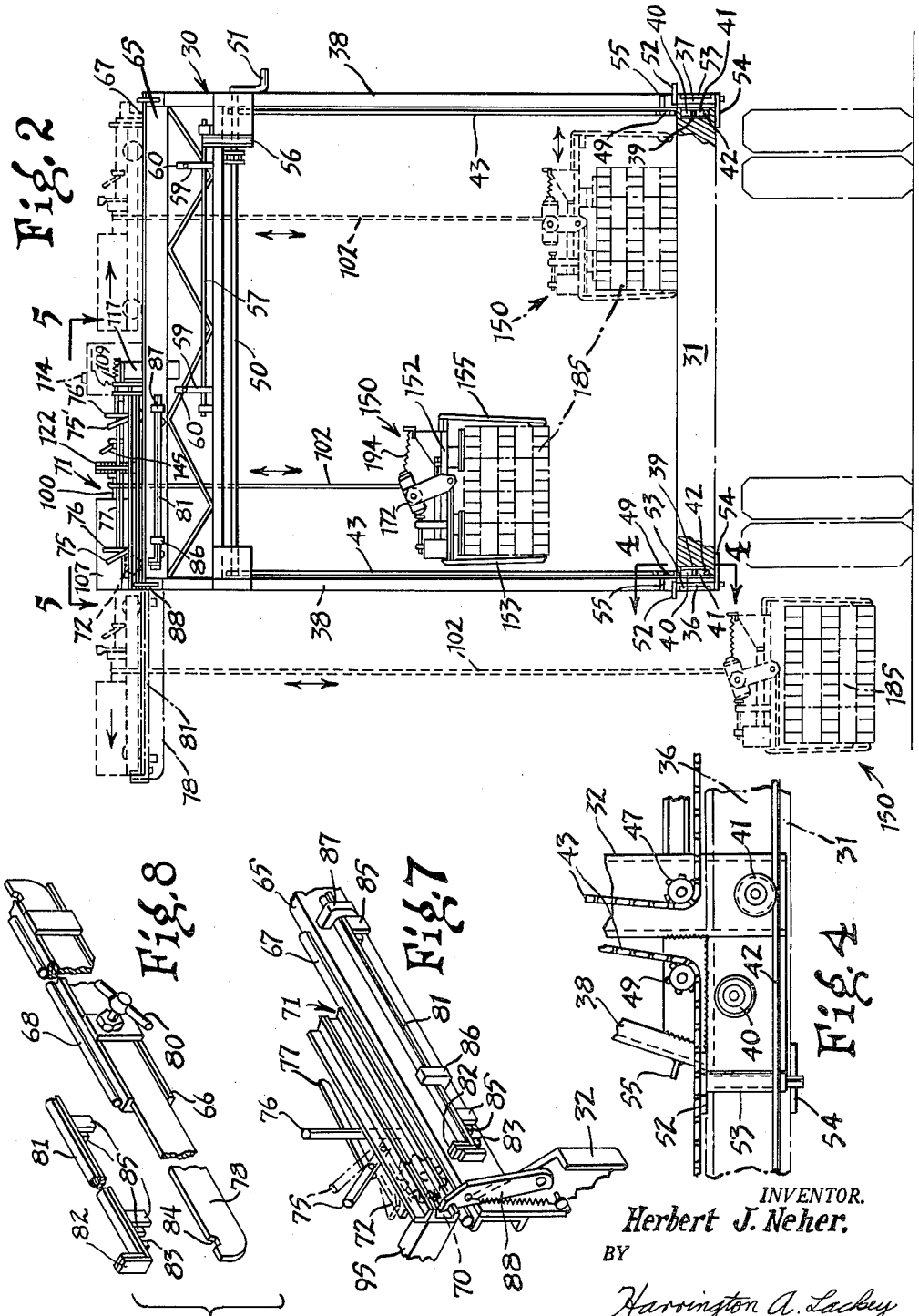
INVENTOR.
Herbert J. Neher.
BY
Harrington A. Lackey
ATTORNEY.

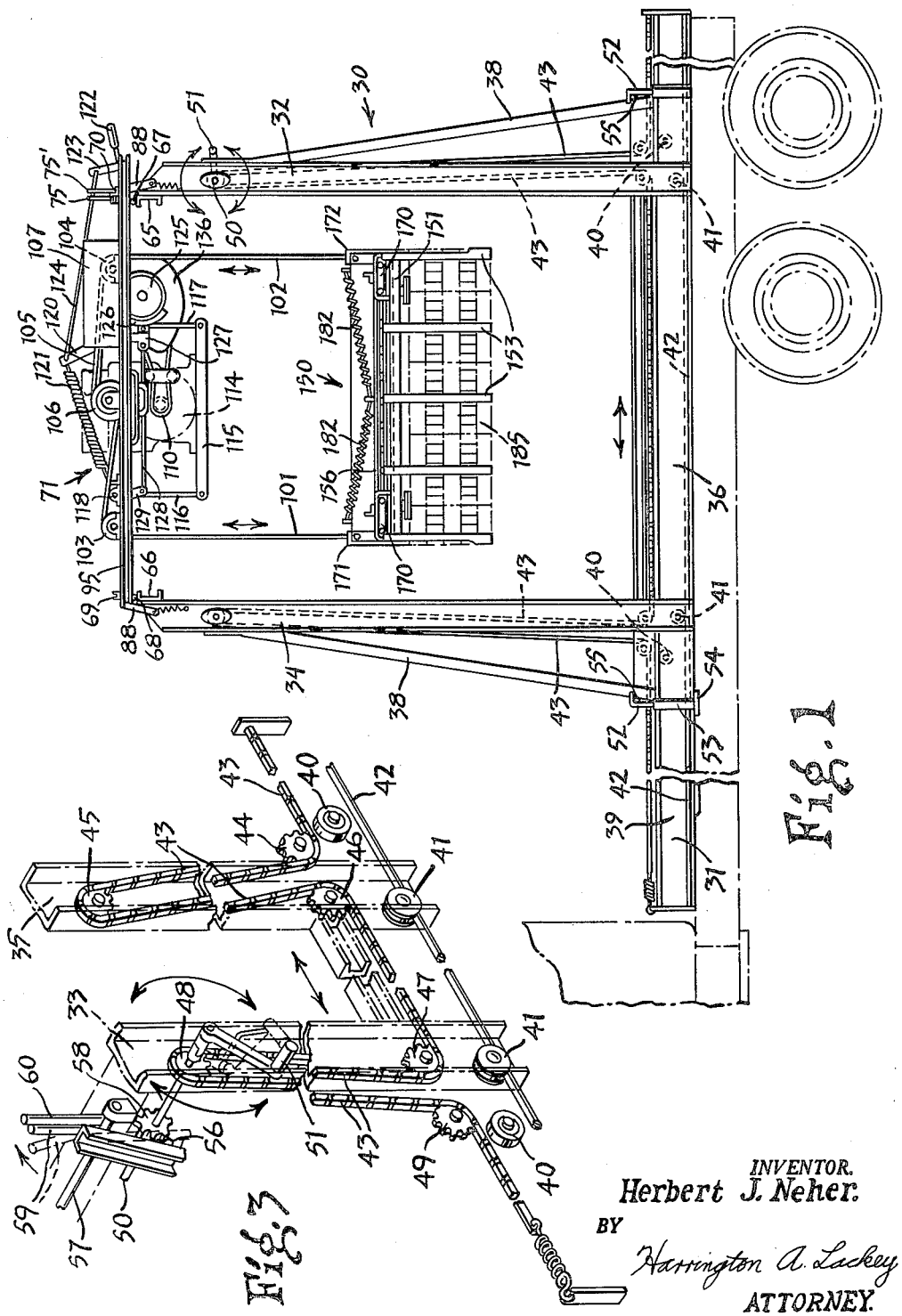

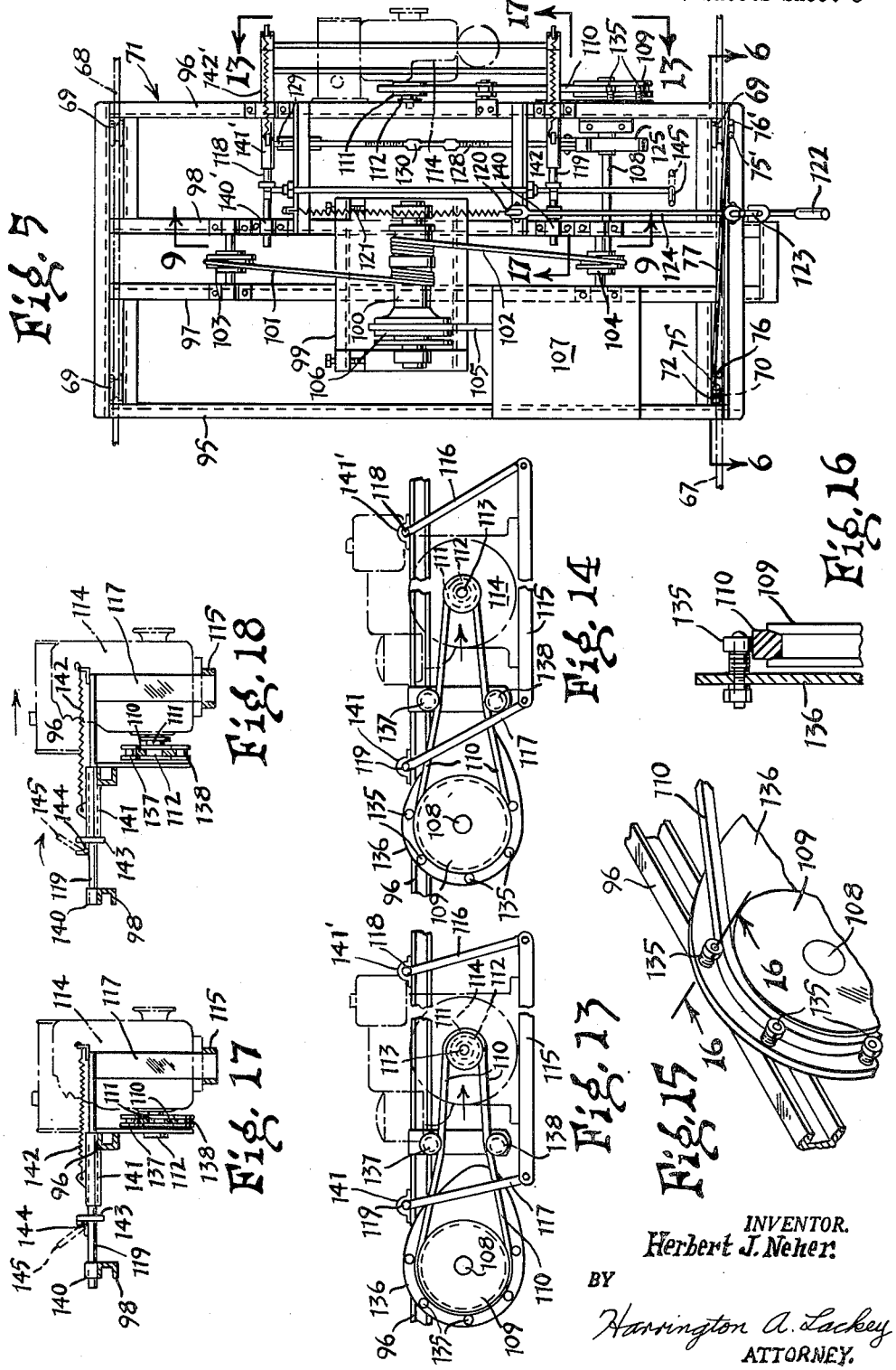

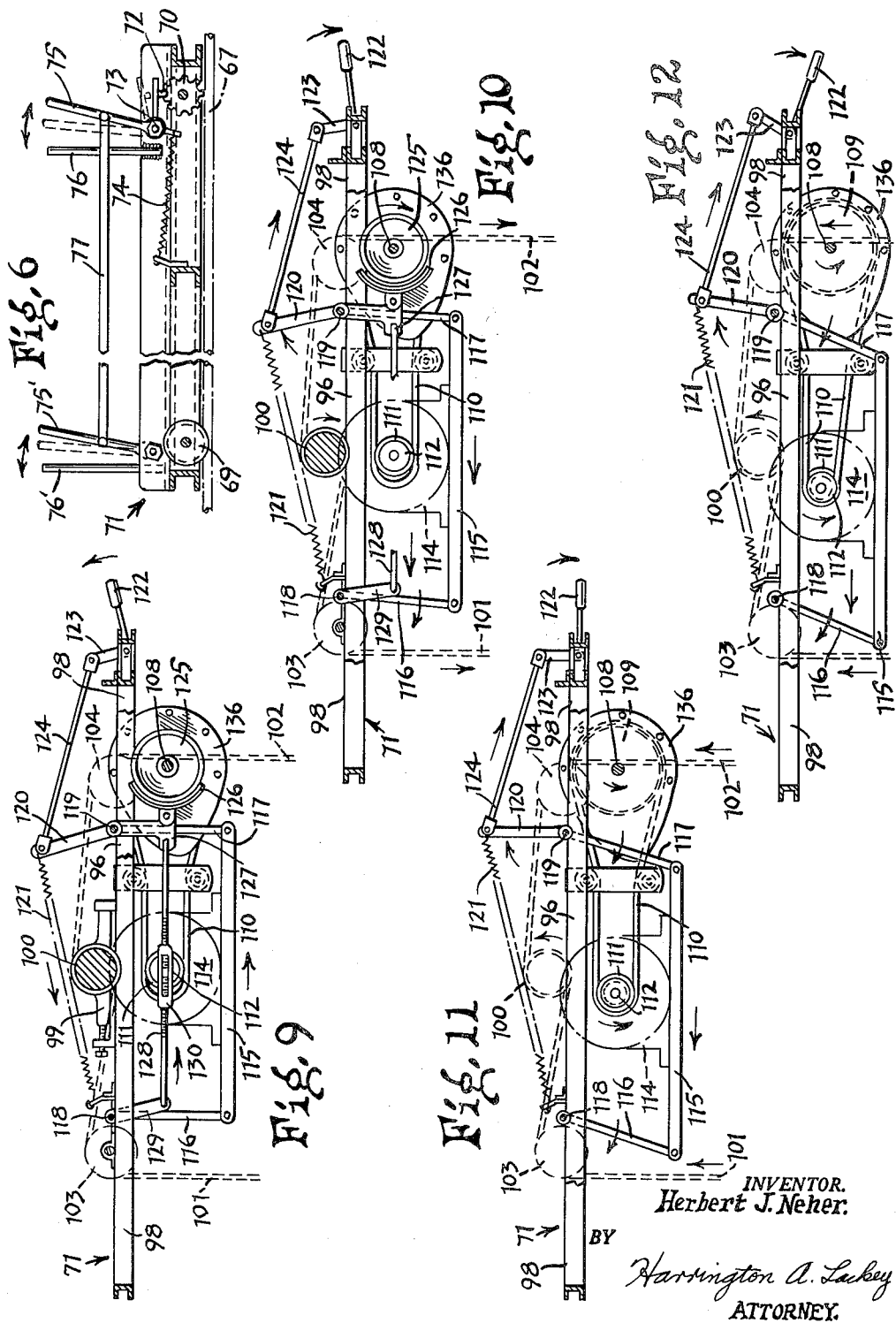

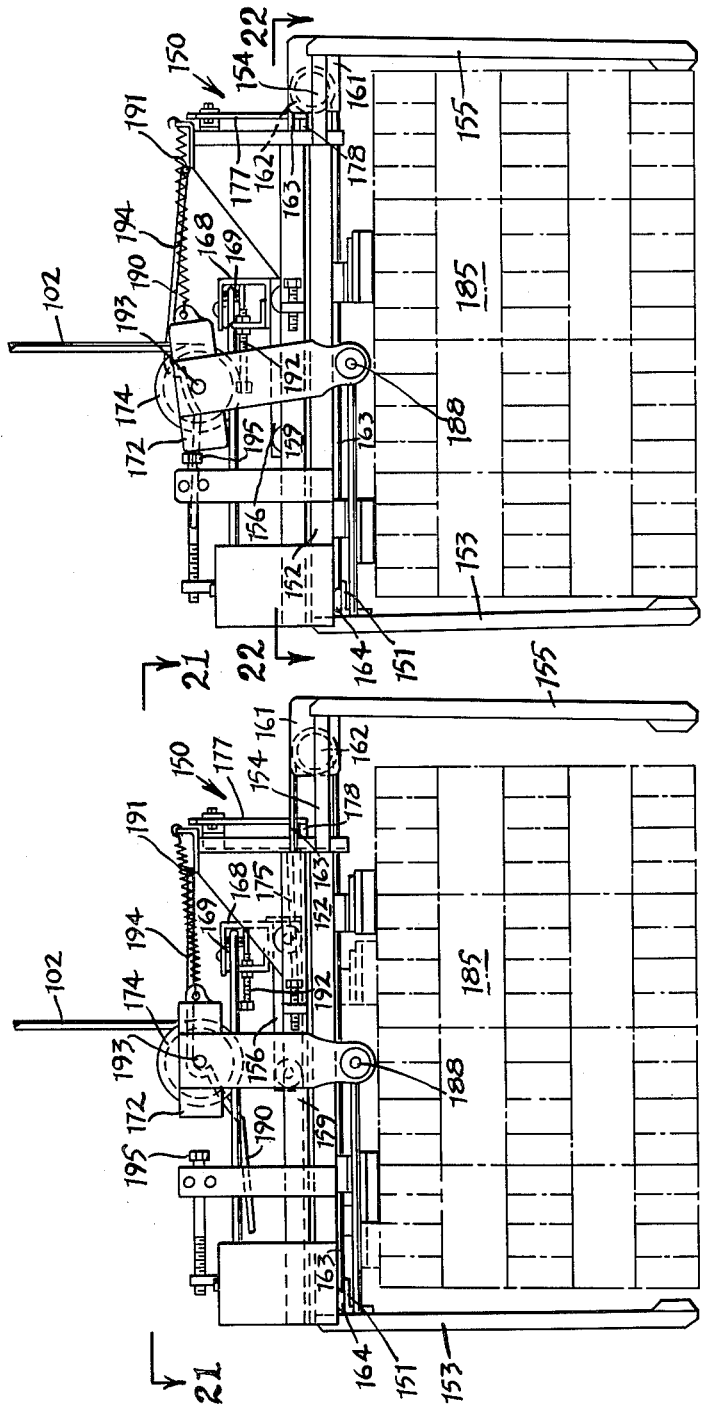

May 29, 1962  H. J. NEHER  3,036,721
APPARATUS FOR TRANSPORTING STACKS OF BRICK AND THE LIKE
Original Filed Sept. 25, 1958  7 Sheets-Sheet 6

INVENTOR.
Herbert J. Neher.
BY
Harrington A. Lackey
ATTORNEY

May 29, 1962  H. J. NEHER  3,036,721
APPARATUS FOR TRANSPORTING STACKS OF BRICK AND THE LIKE
Original Filed Sept. 25, 1958  7 Sheets-Sheet 7
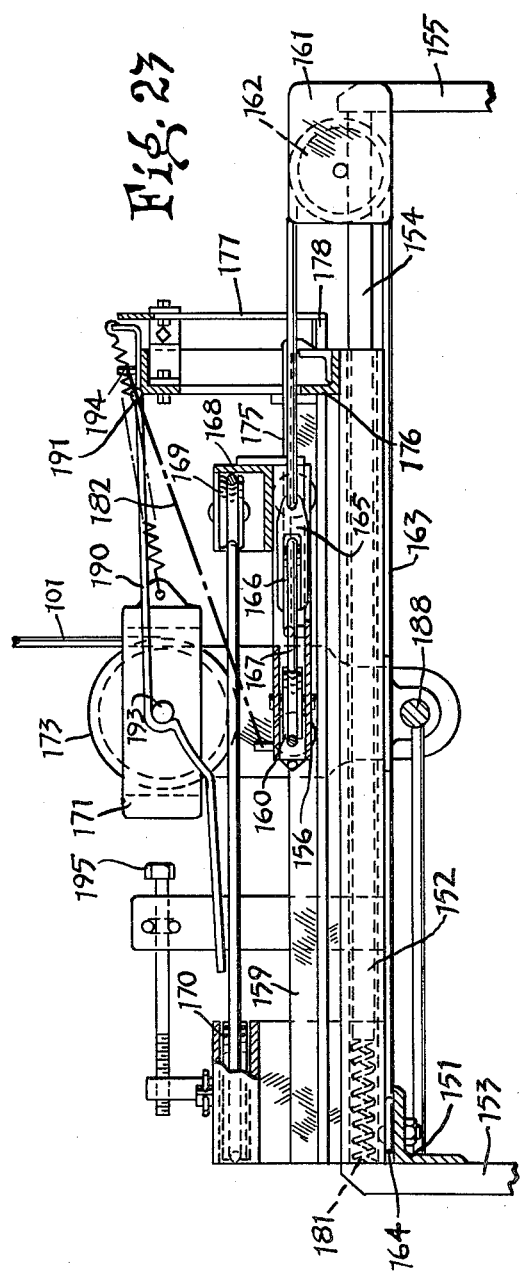
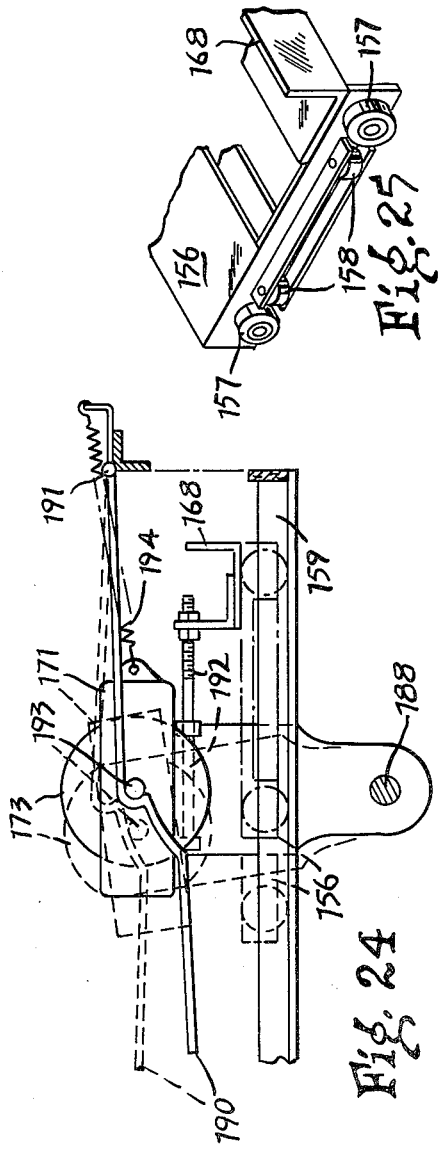
INVENTOR.
*Herbert J. Neher.*
BY
*Harrington A. Lackey*
ATTORNEY.

United States Patent Office 3,036,721
Patented May 29, 1962

3,036,721
APPARATUS FOR TRANSPORTING STACKS OF BRICK AND THE LIKE
Herbert J. Neher, Decatur, Ala., assignor to American Truck Body Company, Martinsville, Va., a corporation of Virginia
Original application Sept. 25, 1958, Ser. No. 763,236. Divided and this application May 31, 1960, Ser. No. 36,100
3 Claims. (Cl. 214—75)

This invention relates to an apparatus for transporting stacks of brick and the like and is an improvement over the Neher Patents No. 2,668,731 and No. 2,871,052. This application is a division of the Neher application S.N. 763,236, filed September 25, 1958.

One object of this invention is to provide an apparatus for lifting, transporting, loading and unloading a stack of bricks from one station to another, for example from a truck bed to the ground adjacent the truck.

Another object of this invention is to provide an apparatus for lifting a stack of bricks from a platform and transporting the stack of bricks longitudinally of the platform and transversely of and beyond the edge of the platform and lowering and releasing the stack at a station adjacent the platform.

A further object of this invention is to provide an apparatus for loading and unloading stacks of brick from any portion of the bed of a truck vehicle.

Another object of this invention is to provide an apparatus for unloading small portions or stacks of bricks from the total load of brick on a truck vehicle both easily and quickly.

Another object of this invention is to provide a device for unloading a stack of bricks from a load of bricks on a truck vehicle at any position on either side of the vehicle.

A further object of this invention is to provide an apparatus for transporting stacks of brick having a novel type of motor control for lifting and lowering a stack of bricks at various speeds.

Another object of this invention is to provide an improved device having opposed gripping arms telescopingly engaged to move toward and away from each other to grip and release a stack of bricks.

Another object of this invention is to provide a device having a novel control system including cables and sheaves which are adapted to first move the gripping arms toward each other until they firmly engage a stack of bricks and then lift the device and the stack of brick to an elevated position.

Further objects and advantages of the invention will be apparent from the following descriptions taken in conjunction with the drawings, wherein:

FIG. 1 is a side elevation of the invention mounted on a truck bed;

FIG. 2 is a rear end elevation of the invention with the brick hoisting apparatus in various operative positions;

FIG. 3 is a perspective fragmentary view of the operational parts of the supporting frame control mechanism;

FIG. 4 is a section taken along the lines 4—4 of FIG. 2;

FIG. 5 is a section taken along the lines 5—5 of FIG. 2;

FIG. 6 is a view taken along the lines 6—6 of FIG. 5;

FIG. 7 is a perspective fragmentary view of one corner of the carrier frame and supporting frame;

FIG. 8 is an exploded persepctive view disclosing the extensible parts of a rail on the supporting frame;

FIG. 9 is an operational view taken along the lines 9—9 of FIG. 5 disclosing the motor control for the hoisting apparatus in idle position;

FIG. 10 is a view similar to FIG. 9 in which the brake is released and the hoisting cables are unwinding to lower the hoisting frame;

FIG. 11 is a view similar to FIG. 10 in which the hoisting cables are winding to raise the hoisting frame at a relatively high rate of speed;

FIG. 12 is a view similar to FIG. 11 in which the cables are winding at a relatively low rate of speed;

FIG. 13 is an operational view taken along the lines 13—13 of FIG. 5 disclosing the opposite side of the motor control shown in FIG. 11;

FIG. 14 is a view similar to FIG. 13 disclosing the opposite side of the motor control shown in FIG. 12;

FIG. 15 is a fragmentary prespective view of the pulley on the drive shaft;

FIG. 16 is a view taken along the lines 16—16 of FIG. 15;

FIG. 17 is a view taken along the lines 17—17 of FIG. 5 disclosing an end view of the motor control in the position shown in FIGS. 11 and 13;

FIG. 18 is a view similar to FIG. 17 disclosing an end view of the motor control in the position shown in FIGS. 12 and 14;

FIG. 19 is an enlarged rear end elevation of the hoisting frame with the gripping members in extended position;

FIG. 20 is a view similar to FIG. 19 in which the gripping members are contracted to engage a stack of bricks or the like;

FIG. 23 is an enlarged fragmentary view taken along the lines 23—23 of FIG. 21;

FIG. 24 is a fragmentary side elevational view of the self-balancing mechanism in alternate operating positions; and FIG. 25 is a fragmentary perspective view disclosing the bearings on one end of the equalizing bar.

Figures 21, 22:
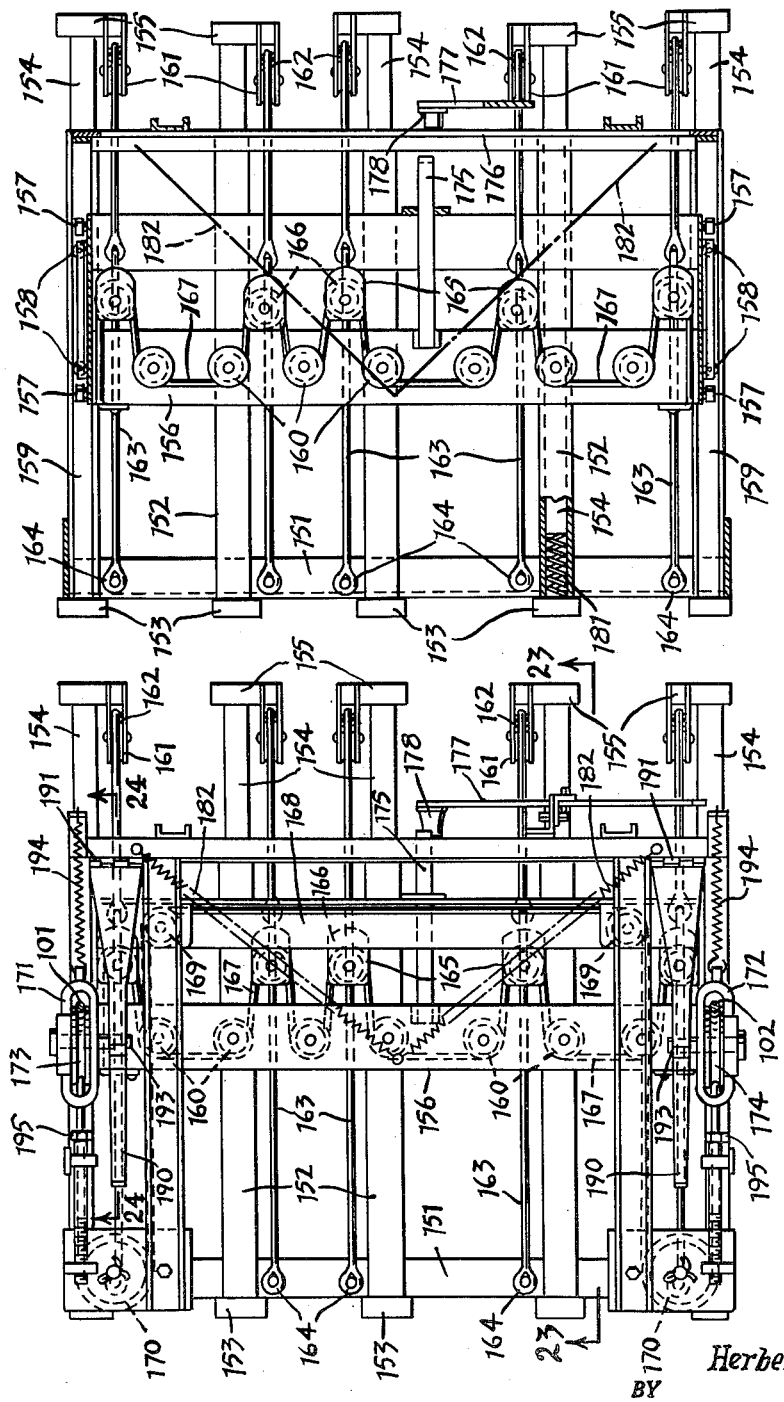
FIG. 21 is a section taken along the lines 21—21 of FIG. 19.
FIG. 22 is a view taken along the lines 22—22 of FIG. 20.

Referring now more particularly to FIGS. 1-4, a supporting frame generally designated 30 is mounted for longitudinal movement upon a truck bed 31. The supporting frame 30 is a superstructure comprising four vertical members 32, 33, 34 and 35 defining its corners. A longitudinal base member 36 is fixed to the bottoms of vertical members 32 and 34 and is supported for longitudinal movement along the left side edge of the truck bed 31, looking toward the front of the truck bed as in FIG. 2. Likewise, longitudinal base member 37 is fixed to the bottom of the vertical members 33 and 35 and is supported for longitudinal movement along the right side edge of the truck bed 31. Knee braces 38 are also provided for additional support between each vertical member 32–35 and its supporting longitudinal base member 36 or 37. Channel-shaped grooves 39 are provided along the longitudinal edges of the truck bed 31 in order to receive and engage the upper rollers 40 and lower rollers 41 rotatably mounted on the insides of the base members 36 and 37. The lower rollers 41 are adapted to roll along a track 42 fixed on the lower flange of the groove 39.

In order to propel the supporting frame 30 longitudinally of the truck bed 31, the opposite ends of a pair of chains 43 are fixed to the opposite ends of the side edges of the truck bed 31. Each chain 43 is looped around its respective sprocket 44 mounted near the front of the base member 36 or 37, and up and over sprocket 45 mounted near the top of the front vertical member, 34 or 35, and down and beneath sprocket 46 mounted adjacent sprocket 44. The chain 43 then extends toward the rear and around sprocket 47 mounted near the base of the vertical member, 32 or 33, up and over the sprocket 48 mounted near the top of the rear vertical member and then down and beneath sprocket 49 adjacent sprocket 47. Sprockets 48 are fixed on the transverse shaft 50 mounted for rotation near the top of the rear vertical members 32 and 33. A handle 51 is mounted on one end of the shaft 50 for gradually winding the chains 43 over the sprockets to thereby move the supporting frame 30 longitudinally of the truck bed 31.

Locking pins 52 are provided at opposite ends of the base members 36 and 37 for locking the supporting frame 30 to the truck bed 31, as best disclosed in FIGS. 1, 2 and 4. When the pin 52 is in locking position, it extends through the collar 53 on the base member and through an aperture in a plate 54 fixed to the truck bed 31. In order to unlock the supporting frame 30 from the truck bed 31, the pin 52 is lifted vertically to remove it from the plate 54, and the upper end of the pin 52 is hung over a hanger 55 on a knee brace 38. Although only one plate 54 is disclosed, the number of plates may be increased to provide a plurality of locking positions.

The winding shaft 50 is normally locked against rotation by means of a pawl 56 pivotally mounted on a shaft 57, as disclosed in FIGS. 2 and 3. The pawl 56 normally engages a star wheel or ratchet 58 fixed to the winding shaft 50. By moving the pawl handle 59 against the adjacent stationary handle 60, the pawl 56 is disengaged from the star wheel 58 so that the winding shaft 50 may be freely rotated. As disclosed in FIG. 2, the handles 59 and 60 may be duplicated on the extended shaft 57 at a position more remote from the pawl 56 so that the operator may control the locking and unlocking of the winding shaft 50 from either side of the truck bed 31. Although ordinarily the weight of the pawl 56 is sufficient to normally engage the star wheel 58, a spring may be employed if necessary.

The upper portions of the vertical members 32 and 33 are connected by a transverse frame member 65, and in a like manner the transverse frame member 66 connects the front vertical support members 34 and 35. On top of each frame member 65 and 66 is a tubular rail 67 and 68, respectively, parallel to each other and in the same horizontal plane and adapted to carry the grooved rollers 69 and 70 rotatably mounted on the control carrier frame 71, in order to permit the transverse movement of the carrier frame across the top of the supporting frame 30.

The carrier frame 71 may be locked against movement across the rails 67 and 68 by means of the locking mechanism disclosed in FIG. 6. The flanges of the grooved roller 70 are serrated to provide means for engaging the pawl 72 pivoted on pin 73 to the frame 71. The pawl 72 is normally urged into engagement with the toothed roller 70 by means of the spring 74. By manipulating the pivoted handle 75 toward stationary handle 76, the pawl 72 may be disengaged from the roller 70 to permit free movement of the rollers 69 and 70 over the rails 67 and 68. For the convenience of the operator, additional handles 75¹ and 76¹ may be provided, with the handle 75¹ being linked to the handle 75 by means of a connecting rod 77.

In order to permit movement of the carrier frame 71 beyond the side edge of the truck bed 31, the effective lengths of the rails 67 and 68 may be extended by sliding the extensible sub-rails 78 within the channel-shaped insides of the transverse frame members 65 and 66 beyond the ends of the rails 67 and 68 and clamping the sub-rail 78 against the channel shaped member 65 or 66 by means of a wing nut or other clamping device 80, as best disclosed in FIG. 8. An extensible rail member 81 having a stop 82 at one end is then fitted on top of the sub-rail 78 and held there by means of a mating tongue 83 and groove 84 and straddle members 85. In this position the top of the extensible rail 81 is flush with either of the rails 67 or 68 and will permit a grooved roller 69 to roll beyond the ends of the rails 67 and 68 to the limit of the stop 82. The length of the extensible sub-rails 78 and rails 81 is sufficient to permit the entire carrier frame 71 to roll beyond the side of the vehicle bed 31 and unload a stack of brick with plenty of clearance between the frame 71 and the side of the vehicle bed 31. When the extensible sub-rails 78 and rails 81 are not in use, the sub-rail 78 is slideably returned to its orginal position within the channel-shaped member 65 or 66 so that their ends are flush and the wing nut 80 tightened. The extensible rail 81 is carried by the hangers 86 and 87 on the side of the channel-shaped member 65 or 66, as best disclosed in FIG. 7.

In order to prevent the carrier frame 71 from rolling off the supporting frame 30, a spring-biased detent 88 is pivoted on the upper end of each vertical member 32–35 to engage a mating notch near the end of the carrier frame 71. The frame 71 may be released for movement on the extensible rails 81 by pivoting the detent 88 away from the side of the frame.

The carrier frame 71 comprises outer longitudinal members 95 and 96 and inner longitudinal members 97 and 98. Mounted on top of the inner members 97 and 98 is a winch frame 99 rotatably supporting a winch 100. The opposite ends of a single cable, or two separate cables, 101 and 102 are attached to the winch 100 in such a manner that they both will be wound upon the winch when it is rotated in one direction and unwound when rotated in the reverse direction. Hoisting cable 101 passes over a pulley 103 rotatably mounted between the inner longitudinal members 97 and 98. In a like manner the hoisting cable 102 passes over the pulley 104 also rotatably mounted between the inner longitudinal members 97 and 98. The winch 100 is rotated by means of a continuous belt 105 which passes around the winch sheave 106. The belt 105 is driven by another pulley and a series of reduction gears, not shown, within the reduction gear box 107, all of which gears are ultimately driven from the drive shaft 108 supported transversely toward the rear of and below the frame members 97, 98 and 96. The drive shaft 108 terminates in a pulley 109 rotated by a continuous belt 110 which, in turn, is selectively driven from either of the two pulleys 111 and 112 of different diameters and mounted on the same stub shaft 113 driven by the motor 114. Any number of pulleys of different diameters may be mounted on the stub shaft 113 depending on the number of speeds desired.

The motor 114 is mounted on a platform 115, which is hinged at opposite ends to straps 116 and 117, which are in turn pivoted at their upper ends to shafts 118 and 119, respectively. As best disclosed in FIGS. 9–12, the motor 114 may be longitudinally and swingably moved in a vertical plane by means of the lever 120, normally biased forward by the spring 121. The lever 120 is fixed to the shaft 119 to pivot the straps 116 and 117 and the motor platform 115 forward and to engage either of the motor pulleys 111 or 112 with the belt 110. The lever 120 may be urged toward the rear by means of a handle 122 forming one arm of a bell crank 123 pivoted on the rear end of the carrier frame 71 and linked to the lever 120 by means of a connecting rod 124. A brake drum 125 is mounted on the drive shaft 108 and is adapted to be selectively engaged by a brake shoe 126 which is pivotally linked by a T-bar 127 to the shaft 119 and also by means of a connecting rod 128 and lever 129 to the front shaft 118. The connecting rod 128 may be made adjustable by means of the turnbuckle 130.

Thus, by selectively manipulating the handle 122 to the various positions disclosed in FIGS. 9–12, the belt 110 may be selectively disengaged and engaged with either of the motor pulleys 111 or 112, and brake shoe 126 may also be selectively engaged and disengaged with the brake drum 125 in the same operation.

In order to guide the belt 110 around pulley 109, rollers 135 are provided having threaded shafts mounted on plate 136, as best disclosed in FIGS. 15 and 16. Also mounted substantially midway between the pulley 109 and the motor pulleys 111 and 112 are a pair of vertically disposed roller guides 137 and 138 which function as belt tighteners to establish better engagement between the belt 110 and the pulleys around which it passes.

In addition to the motor platform 115 being swingably mounted on the shafts 118 and 119 for longitudinal pivotal movement, the motor 114 and the motor platform 115 may be transversely shifted by the axial movement of the shafts 118 and 119. As best disclosed in FIGS. 17 and 18, the shaft 119 is slideably supported in stationary tubular bearings 140 and 141. The end of the shaft 119 is connected to the bearing 141 by means of a spring 142, which biases the shaft 119 and the motor 114 toward the left of the carrier frame 71 to the position disclosed in FIG. 17, in which the belt 110 is adapted to engage the large diameter motor pulley 111. A flange 143 is fixed to the shaft 119 and is adapted to be engaged by a cam 144 which is pivoted by a handle 145. When the handle 145 is pivoted toward the right as indicated in FIG. 18, the cam 144 engages the flange 143 to urge the shaft 119 toward the right, thus moving the motor 114 toward the right to permit the belt 110 to engage the small diameter pulley 112. Thus, by a combination of manipulations of the handle 145 and the handle 122, the motor 114 may be shifted in such a manner that the belt 110 may be adapted to selectively engage either of the motor pulleys 111 or 112.

Suspended from the control carrier frame 71 by the hoisting cables 101 and 102 is the stack hoisting or gripping frame 150, the details of which are best disclosed in FIGS. 19-25. The hoisting frame 150 comprises an open main frame 151 having mounted thereon a plurality of parallel transversely disposed tubular members 152. One end of each tubular member is closed and is flush with or slightly extends beyond one edge of the main frame 151 (the left edge in the drawings). Fixed to the closed ends of the tubular members 152 and depending downward and inward therefrom are one set of gripping members 153. Slideable in each tubular member 152 is an extensible telescoping member 154. Mounted on the free ends of the telescoping members 154 are a second set of depending stack gripping members 155.

Mounted for transverse movement on top of the main frame 151 is an equalizing bar 156. Each end of the equalizing bar 156 is provided with both vertical roller bearings 157 and horizontal roller bearings 158, as best disclosed in FIGS. 22 and 25 for rolling engagement with the angle iron tracks 159 on the front and rear edges of the main frame 151. Mounted on vertical stub shafts fixed to the equalizing bar 156 for free horizontal rotation are a plurality of sheaves 160. Mounted for rotation in a vertical plane in a sheave block 161 fixed to the outer end of each telescoping member 154 is a sheave 162. A first set of telescoping cables 163 are connected at one end 164 to a portion of the main frame 151. Each telescoping cable 163 passes around a sheave 162 and is connected at its other end to a sheave block 165 intermediate the sheaves 160 on the equalizing bar 156 and the sheaves 162 on the telescoping members 154. A sheave 166 is supported in each sheave block 165 for substantially horizontal rotation. An equalizing cable 167 is fixed at its ends to opposite ends of the equalizing bar 156 and is adapted to pass around each of the equalizing sheaves 160 and the intermediary sheaves 166, there being at least one sheave 160 between each pair of intermediary sheaves 166. As best disclosed in FIG. 23, the sheaves 160 and 166, the equalizing cable 167 and the upper portions of telescoping cables 163 all lie in substantially the same horizontal plane.

The hoisting bar 168 disposed transversely of the main frame 151 and fixed in spaced relation to the equalizing bar 156, supports a pair of idler pulleys 169 mounted for horizontal rotation. Also mounted on the left side of the main frame 151 for horizontal rotation are another pair of idler pulleys 170. Pivoted to the upper front and rear edges of the main frame 151 are hoisting sheave blocks 171 and 172. Mounted in the respective sheave blocks 171 and 172 for rotation in a vertical plane are hoisting sheaves 173 and 174. The hoisting cable 101 which passes from the winch 100 over the pulley 103 on the control carrier frame 71, passes down and around front hoisting pulley 173, then in a substantially horizontal direction around the adjacent sheave 170 and around the idler pulley 169. Although the cable 101 could be optionally attached to the hoisting bar 168 to eliminate the idler pulley 169, in the preferred form of the invention as disclosed in the drawings, the direction of the cable 101 is continuous and passes around both idler pulleys 169 to become cable 102 on the rear side of the main frame 151. The cable 102 after passing around the idler pulley 169 extends horizontally around the large idler pulley 170 beneath and around the hoisting pulley 174 and thence upward around the pulley 104 to the winch 100 mounted on the control carrier frame 71.

A locking mechanism is provided to maintain the gripping members 153 and 155 in extended locked position. This locking mechanism comprises a latch 175 pivoted to the equalizing bar 156, or to any part which is movable with the equalizing bar. The free end of the latch is hooked so that it will fall by gravity and engage a flange 176 on the main frame to prevent the movement of the equalizing bar and consequently any movement of the telescoping cable 163 to draw the gripping members 155 toward the opposing gripping members 153. The latch 175 is adapted to be easily disengaged from the flange 176 by means of a pivoted lever 177 having a lip 178 adapted to engage the hooked end of the latch to raise it above the flange 176, as best disclosed in FIG. 21. When the equalizing bar 156 is moved toward the left of FIG. 22, the latch 175 also moves to the left, but will drop into locking position over the flange 176 when the gripping members 155 return to extended position.

Even when the latch 175 is disengaged from the flange 176, and when the gripping members 153 and 155 are resting on the vehicle bed 31, the gripping members 153 and 155 are normally urged into extended position by means of the coil springs 181 biased against the telescoping members 154 within the tubular members 152. In addition to the coil springs 181, springs 182 are attached to the main frame adjacent the gripping members 155 at one end and are connected to the equalizing bar 156 at the other end to urge the equalizing bar toward the right side of the main frame 151.

When the winch 100 begins winding the cables 101 and 102, the effect is to move the hoisting bar 168 and consequently the equalizing bar 156 toward the left of FIGS. 19-23, operating against the springs 181 and 182 to pull the intermediary sheave blocks 165 and the telescoping cables 163 and sheaves 162 toward the left to move the gripping members 155 toward the gripping members 153 and firmly grip a stack of bricks 185. The extended position of the gripping members 153 and 155 is best disclosed in FIGS. 19 and 21, and the compressed position is best disclosed in FIGS. 20 and 22. As best disclosed in FIG. 22, if the surface of the stack of bricks 185 is irregular, each gripping member 155 is actuatable independently of any other gripping member to securely grip the irregular surface because of the equalizing cable 167 independently adjusting the telescoping members 154 through the intermediary sheave blocks 165.

After the stack of bricks 185 is firmly held by the gripping members 153 and 155, the translatory motion of the equalizing bar 156 is stopped. Continued winding of the cables 101 and 102 causes the entire hoisting frame 150 to be elevated with its load of brick 185 above the vehicle bed 31, as best disclosed by the solid line position in FIG. 2.

Because the center of gravity of the hoisting frame 150 varies with the shifting of the gripping members 155, the balance of the hoisting frame 150 is constantly maintained in the various positions of the gripping members by means of a unique self-balancing mechanism. As previously stated, the hoisting sheave blocks 171 and 172 are pivoted to the main frame 151 by pins 188, although under normal conditions the sheave blocks 171 and 172 are locked in the position disclosed in FIGS. 19 and 24 by a gravity-actuated latch 190 hinged to the main frame at 191. The hoisting bar 168 is provided with a latch tripping pin 192 which is adapted to engage and lift the latch 190 from the extended shaft 193 of the pulley 173 or 174, when the equalizing bar 156 and hoisting bar 168 are moved toward the stationary gripping members 153. However, even when the hoisting sheave blocks 171 and 172 are unlatched, they are maintained in their original positions by the retractible springs 194. When the gripping members 153 and 155 have securely gripped the stack of bricks 185, as best disclosed in FIG. 20, and when the cables 101 and 102 begin exerting a lifting force upon the hoisting sheaves 173 and 174, the sheave blocks 171 and 172 will pivot about pin 188 toward the stationary gripping members 153 to shift the center of gravity of the entire hoisting frame 150 in the same direction as the movement of the gripping members 155. In order to limit the pivotal movement of the sheave blocks 171 and 172, stop pins 195 are provided.

From the foregoing description of the structural details of this invention, it will become apparent that a variety of operations are possible for the transporting of stacks of brick and other like material.

By manipulation of the handle 51, the supporting frame 30 may be longitudinally moved relative to the vehicle bed 31 to any desired position. By manipulation of the handles 75 or 75¹, the control carrier frame 71 may be transversely moved on the supporting frame 30 in such a manner that the combined operation of the supporting frame 30 and the control carrier frame 71 will place the hoisting frame 150 in position over any stack of bricks on the vehicle bed 31. When the hoisting frame 150 is empty, the latch 175 engages the flange 176 on the main frame to maintain the gripping members 155 and 153 in extended position, even when the hoisting frame is elevated above the truck bed 31.

The hoisting frame 150 is lowered into position over a stack of bricks 185 by manipulating the handle 122 to the position of FIG. 10, which will release the brake to permit a very rapid unwinding of the cables 101 and 102 by virtue of the weight of the hoisting frame 150. However, the speed of unwinding is controlled by manipulation of the handle 122 to vary the degree of friction between the brake shoe 126 and brake drum 125. The lowering of the hoisting frame 150 may of course be stopped at any time by raising the handle 122 to the position disclosed in FIG. 9, in which event the brake shoe 126 will completely engage the brake drum 125 to halt the rotation of the drive shaft 108 and consequently the winch 100.

After the hoisting frame 150 has settled with the gripping members in extended position over a stack of bricks 185, the belt 110 may be thrown into engagement with one of the motor pulleys 111 or 112 to cause the cables 101 and 102 to wind around the winch 100 at one of two speeds according to the position of the controls as disclosed in FIG. 11 or 12. As previously described, the initial winding of the cables 101 and 102 will cause the hoisting bar 168 and equalizing bar 156 to move toward the stationary gripping members 153 until the gripping members 153 and 155 have gripped the stack of bricks 185 as disclosed in FIG. 20, at which point continued winding of the cables 101 and 102 will elevate the hoisting frame 150.

After the stack of bricks 185 is elevated to the solid line position disclosed in FIGS. 1 and 2, it may be transported to any part of the vehicle bed 31 by a longitudinal movement of supporting frame 30 or the transverse movement of the control carrier frame 71. In order to unload the stack of bricks 185 from the vehicle bed 31, the sub-rails 78 are extended beyond the side of the vehicle bed 31 and capped with the extensible rails 81 to permit the control carrier frame 71 to be rolled beyond either side edge of the vehicle bed and permit the unwinding of the cables 101 and 102 to lower the hoisting frame 150 with its stack of bricks 185 to the ground or a loading platform. When the stack of bricks 185 touches the ground, tension in the hoisting cables 101 and 102 will be released permitting the springs 182 to retract the equalizing bar 156. Compressed springs 181 will also expand within the tubular member 152 to extend the telescoping members 154 and permit the gripping members 155 to release the stack of bricks. Also the retractible springs 194 will pivot the hoisting sheave blocks 171 and 172 to their original positions disclosed in FIGS. 19, 23 and the solid line position of FIG. 24. The return of the hoisting bar 168 to its original release position will permit the latch 175 to automatically engage the flange 176 and prevent gripping members 153 and 155 from moving toward each other until the latch is again released by the lever 177.

It will be seen that the above invention is particularly useful in loading and unloading small units of brick or other material from a vehicle when deliveries of several small orders must be made to several customers or consumers from one large load of material.

It will be apparent to those skilled in the art that various changes may be made in the invention, without departing from the spirit and scope thereof, and therefore the invention is not limited by that which is shown in the drawings and described in the specification, but only as indicated in the appended claims.

What is claimed is:

1. An apparatus for transporting stacks of bricks comprising a platform having parallel longitudinal side edges for supporting said stacks, a supporting frame, means for mounting said supporting frame over said platform, and means for moving said supporting frame mounting means longitudinally of said platform, parallel rails on said supporting frame comprising channel members extending transversely over said platorm, an extensible sub-rail slidably contained within each channel member and adapted to slide beyond the side of said platform, an extensible rail section adapted to lockingly engage the top of said sub-rail and abut against the end of said overhead rail, the tops of said overhead rail and extensible rail section being flush in operative position, a carrier frame adapted to engage said rails for overhead movement transverse of said platform, and hoisting apparatus mounted on said carrier frame for vertically moving a stack of bricks to and from said platform.

2. The invention according to claim 1 in which the sub-rail comprises flat parallel vertically disposed sides, said extensible rail section having depending straddle members for slidably engaging said sub-rail sides, and means for locking said rail section and sub-rail together.

3. The invention according to claim 2 in which said locking means comprises a cooperating tongue and groove.

References Cited in the file of this patent

UNITED STATES PATENTS

| | | |
|---|---|---|
| 1,614,769 | Amsler | Jan. 18, 1927 |
| 1,990,539 | Fildes | Feb. 12, 1935 |
| 2,499,442 | Wright | Mar. 7, 1950 |
| 2,871,052 | Neher | Jan. 27, 1959 |